US011217806B2

(12) United States Patent
Loretz et al.

(10) Patent No.: US 11,217,806 B2
(45) Date of Patent: Jan. 4, 2022

(54) PH BUFFERING REGION IN A FLOW BATTERY REBALANCING CELL

(71) Applicant: LOCKHEED MARTIN ENERGY, LLC, Bethesda, MD (US)

(72) Inventors: Jeremy Loretz, Boston, MA (US); Srivatsava Puranam, Cambridge, MA (US)

(73) Assignee: Lockheed Martin Energy, LLC, Bethesda, MD (US)

(*) Notice: Subject to any disclaimer, the term of this patent is extended or adjusted under 35 U.S.C. 154(b) by 3 days.

(21) Appl. No.: 16/755,340

(22) PCT Filed: Oct. 8, 2018

(86) PCT No.: PCT/US2018/054798
§ 371 (c)(1),
(2) Date: Apr. 10, 2020

(87) PCT Pub. No.: WO2019/079047
PCT Pub. Date: Apr. 25, 2019

(65) Prior Publication Data
US 2020/0313212 A1    Oct. 1, 2020

Related U.S. Application Data

(60) Provisional application No. 62/574,981, filed on Oct. 20, 2017.

(51) Int. Cl.
*H01M 8/1004* (2016.01)
*H01M 8/0234* (2016.01)
(Continued)

(52) U.S. Cl.
CPC ....... *H01M 8/1004* (2013.01); *H01M 8/0234* (2013.01); *H01M 8/08* (2013.01); *H01M 8/188* (2013.01)

(58) Field of Classification Search
CPC .... H01M 8/0234; H01M 8/08; H01M 8/1004; H01M 8/188
(Continued)

(56) References Cited

U.S. PATENT DOCUMENTS 4,362,791 A * 12/1982 Kaneko ................ H01M 10/36
429/101
6,992,127 B2    1/2006 Lin et al.
(Continued)

FOREIGN PATENT DOCUMENTS

EP         2685537 A1 *  1/2014  ............... C22C 1/02
WO    WO 2014/181498 A1   11/2014
WO    WO 2015/065957 A1   5/2015

OTHER PUBLICATIONS

European Patent Application No. 18869284.2; Extended Search Report; dated Jul. 6, 2021; 8 pages.
(Continued)

Primary Examiner — James M Erwin
(74) Attorney, Agent, or Firm — BakerHostetler

(57) ABSTRACT

The present invention is directed to novel membrane electrode assemblies, and devices and systems incorporating them. Representative membrane electrode assemblies comprise (a) a first, porous electrode; (b) a buffer layer optionally comprising an aqueous solution comprising a pH buffer; (c) a membrane; and (d) a second, porous electrode comprising a catalyst for the generation of oxygen (O2); wherein the membrane is interposed between the first electrode and the second electrode, and the buffer layer is interposed between the membrane and the first electrode.

23 Claims, 6 Drawing Sheets

(51) Int. Cl.
*H01M 8/08* (2016.01)
*H01M 8/18* (2006.01)
(58) Field of Classification Search
USPC .......................................... 429/105
See application file for complete search history.

(56) References Cited

U.S. PATENT DOCUMENTS

| | | |
|---|---|---|
| 9,768,463 B2 | 9/2017 | Goeltz et al. |
| 2011/0200890 A1* | 8/2011 | Kocherginsky ..... H01M 8/1032 |
| | | 429/402 |
| 2014/0030573 A1 | 1/2014 | Esswein et al. |
| 2014/0170511 A1* | 6/2014 | Tolmachev ........... H01M 8/188 |
| | | 429/418 |
| 2016/0211539 A1 | 7/2016 | Goeltz |
| 2016/0308234 A1 | 10/2016 | Reece et al. |
| 2017/0291916 A1 | 10/2017 | Millard |

OTHER PUBLICATIONS

International Patent Application No. PCT/US2018/054798; Int'l Search Report and the Written Opinion; dated Feb. 11, 2019; 21 pages.
International Patent Application No. PCT/US2018/054798; Int'l Preliminary Report on Patentability; dated Apr. 30, 2020; 9 pages.

* cited by examiner

PH BUFFERING REGION IN A FLOW BATTERY REBALANCING CELL

CROSS-REFERENCE TO RELATED APPLICATIONS

This application is the U.S. National Stage Application of International Patent Application No. PCT/US2018/054798, filed Oct. 8, 2018 which claims priority to U.S. Patent Application No. 62/574,981, filed Oct. 20, 2017, the contents of which are incorporated by reference in their entirety herein.

TECHNICAL FIELD

The present invention relates to redox flow batteries and methods for operating the same.

BACKGROUND

Flow batteries are electrochemical energy storage systems in which electrochemical reactants, typically redox active compounds, are dissolved in liquid electrolytes, which are individually contained in negative electrolyte or negolyte and positive electrolyte or posolyte loops and circulated through reaction cells, where electrical energy is either converted to or extracted from chemical potential energy in the reactants by way of reduction and oxidation reactions. Optimal performance of the flow battery relies on the ability to maintain balance between the posolyte and negolyte, both in terms of pH and state of charge. Upon extended cycling, flow batteries typically develop an imbalance in both proton and electron content between the posolyte and negolyte due to the presence of parasitic electrochemical side reactions. One reaction is the evolution of hydrogen gas from water at the negative electrode, which results in an imbalance in both the electron (state-of-charge) and proton content between the posolyte and negolyte. This imbalance, if left uncorrected, subsequently results in a decrease in system performance. An imbalanced state may be corrected by processing either the posolyte, negolyte, or both in a balancing cell (synonymously referred to as a "rebalancing cell" in this disclosure).

Various methods have been described for balancing flow battery electrolytes. These methods primarily address balancing the electron (state-of-charge) content between the posolyte and negolyte. Certain methods have been described that can be used to address the simultaneous balancing of both the electron and proton contents of these electrolytes, but none have considered the circumstance where a high pH gradient across the balancing cell membrane is used. The present invention is aimed at addressing at least this deficiency.

SUMMARY

The present invention is directed to electrode membrane assemblies, balancing cells, and flow batteries, and methods of operating the same. Certain embodiments comprise membrane electrode assemblies, each membrane electrode assembly comprising:
  (a) a first electrode;
  (b) a buffer layer comprising a spacer and optionally comprising an aqueous solution comprising a pH buffer;
  (c) a membrane; and
  (d) a second electrode comprising a catalyst for the generation of oxygen ($O_2$); wherein the membrane is interposed between the first electrode and the second electrode, and the buffer layer is interposed between the membrane and the first electrode.

In separate embodiments, the first electrode is porous or non-porous, or may even be absent (and the surface area of a bipolar plate adjacent to the membrane electrode assembly (MEA) is used as the electrode). In certain embodiments, one or both of the electrodes are porous. In certain embodiments, one or both of the electrodes are non-porous. In certain embodiments, the buffer layer comprises at least a physical spacer between the membrane and the first electrode (or surrogate), but may also contain a pH buffer solution, which in operation of the flow battery may comprise the working electrolyte, for example, the negolyte, of an associated redox flow battery and contains the same buffer as the negolyte.

In certain embodiments, one or both electrodes comprises an allotrope of carbon, for example, present as a carbon fiber cloth. Other materials may include carbon felt, paper, and graphite composites. Non-reactive solid metals, such as Pt, Pd, Ti, or Au, or alloys may also be used.

The spacer function of the buffer layer may be provided by an electrically non-conducting, porous structural material, which allows the buffer layer to provide the necessary physical integrity of maintaining a fixed separation distance between the membrane and the first electrode (or surrogate). Such spacers may include, but are not limited to porous organic polymers or inorganic glasses or other inorganic materials, arrays (e.g., woven or non-woven cloth) of organic or inorganic polymer(s), inorganic aerogels, or a combination thereof. This structural material may also comprise polymer or glass coated conductive materials, woven or non-woven materials, felts, papers, polymer foams, or any combination thereof. Typically, these spacers provide a spacing between the first electrode and the membrane of a distance in a range of from about 10 microns to about 1000 microns, preferably from 50 microns to 500 microns.

The catalyst of the membrane electrode assembly, capable of generating oxygen, may comprise an oxide, fluoride, or oxyfluoride of cobalt, iridium, iron, manganese, nickel, ruthenium, indium, tin or a combination thereof. Preferably, this catalyst is an oxide of iridium, an oxide of nickel, or an oxide of a nickel-iron alloy.

The membrane may comprise one or more layers, and may include an ion exchange membrane. The ion exchange membrane may be a cation or proton exchange membrane, an anion exchange membrane, or may contain multiple or both types of membranes.

The invention also contemplates balancing cells comprising the membrane electrode assemblies described herein, e.g., wherein the membrane electrode assemblies are fluidically connected to a half-cell chamber, wherein the second electrode forms part of a wall of the half-chamber. The half-cell chamber may further comprise a second electrolyte in fluid communication with the second electrode. The pH of this second electrolyte is typically, but not necessarily, in a range of from about 0 to about 7, for optimal performance. The second electrolyte may contain or be substantially free of organometallic materials, including metal-ligand coordination compounds.

Other embodiments include those involving redox flow batteries, each battery (or stack of cells) comprising at least one electrochemical cell comprising an aqueous working electrolyte comprising a redox active material, wherein the at least one electrochemical cell is in fluid communication with the first electrode of any of the membrane electrode assemblies described herein. In certain embodiments, the aqueous working electrolyte has a pH in a range of from 0 to 14, or from 7 to 14, and contains a redox active material as a working fluid in the flow battery cell.

Also provided are methods of operating such cells or systems, each method comprising passing a current through said membrane electrode assembly and/or the rebalancing cell so as to generate oxygen and promote the flow of electrons and protons to the working electrolyte of a flow battery.

BRIEF DESCRIPTION OF THE DRAWINGS

The present application is further understood when read in conjunction with the appended drawings. For the purpose of illustration, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIGS. 5(A-B) illustrate the effect of current density on pH at the interface between a membrane and an alkaline electrolyte, where the membrane is positioned between an acidic electrolyte/solution (such as present in a rebalancing cell) and the alkaline electrolyte.

DETAILED DESCRIPTION OF ILLUSTRATIVE EMBODIMENTS

Figure 1:
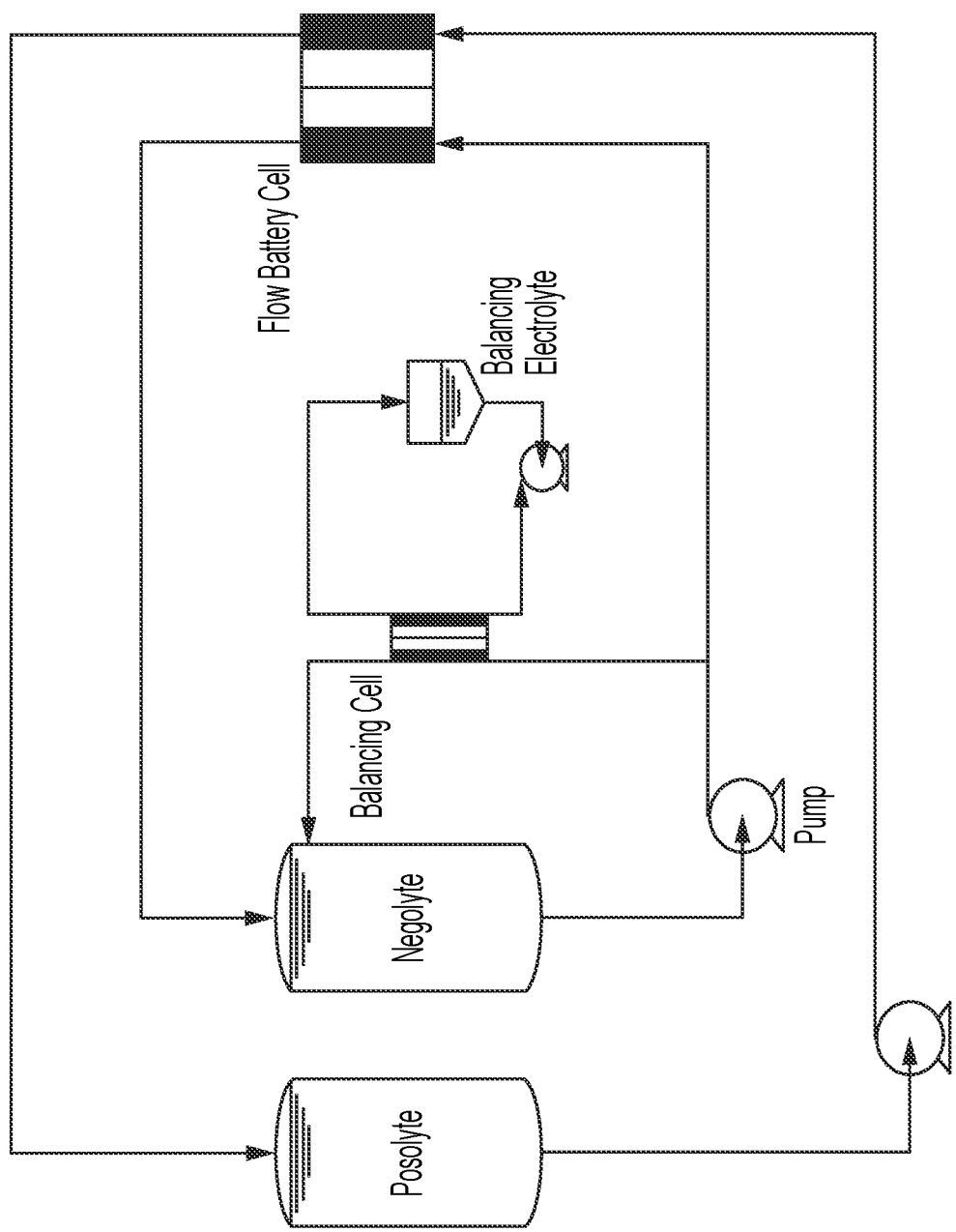
FIG. 1 provides a schematic of one embodiment of a flow battery of the present invention, including placement of the balancing cell in-line with the negolyte line of the flow battery.

The present invention relates to redox flow batteries and methods and apparatuses for monitoring the compositions of the electrolytes (posolyte or negolyte or both) therein. In particular, the present invention relates to methods and configurations for balancing the pH and state-of-charge of an electrolyte stream of a flow battery, using the novel balancing cells and membrane electrode assemblies described herein.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to apparatuses and methods of using said apparatuses. That is, where the disclosure describes and/or claims a feature or embodiment associated with a system or apparatus or a method of making or using a system or apparatus, it is to be appreciated that such a description and/or claim is intended to extend these features or embodiment to embodiments in each of these contexts (i.e., system, apparatus, and methods of using).

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The present invention is directed to, inter alia, flow battery configurations where a balancing cell operates in fluid communication with an electrolyte, especially the negative electrolyte ("negolyte"), of a flow battery or other electrochemical device, so as to provide a device capable of correcting excursions of pH and state-of-charge within the electrolyte. It is desirable to configure and operate the balancing cell such that impurities are not introduced into the flow battery electrolytes. Particular impurities to be avoided are those that can accumulate onto the negative electrode of the flow battery, catalyze the evolution of $H_2$, and further catalyze the flow battery state-of-charge imbalance. In particular, it will be preferred to operate the balancing cell wherein its positive electrode comprises an $O_2$ evolution catalyst that is highly resistant to corrosion and its negative electrode comprises a current collector that is highly resistant to corrosion. Furthermore, it is desirable to prevent cross-over of active materials from the negolyte compartment into the second half-chamber, as such crossover can deteriorate performance by either catalyst fouling or by formation of deposits inside the membrane leading to higher membrane resistance. Finally, while it may be desirable to prevent large pH gradients across the membrane in the balancing cell, such is not always practicable and in fact may be overly limiting to optimal performance. $O_2$ evolution is often performed under strongly acidic conditions, which may not be compatible with flow battery technologies in which the electrolytes are formulated with neutral or alkaline pH: the resulting pH gradient may eventually lead to pH equilibration, causing electrolytes in the main batteries to acidify. As such, it may be desirable to perform $O_2$ evolution at a pH value as similar as possible to the pH of electrolytes in the main battery, which may require careful selection of membrane and catalyst materials. Alternatively, the disclosures herein provide practicable solutions to these problems.

Accordingly, certain embodiments of the present invention provide electrode membrane assemblies, each assembly comprising:

a membrane electrode assembly comprising:
 (a) a first electrode;
 (b) a buffer layer comprising a spacer;

(c) a membrane; and
(d) a second electrode comprising a catalyst for the generation of oxygen ($O_2$); wherein the membrane is interposed between the first electrode and the second electrode, and the buffer layer is interposed between the membrane and the first electrode.

In separate embodiments, the first electrode comprises a porous or non-porous material or is absent (and the surface area of an optional bipolar plate may be used as the electrode). In certain, separate embodiments, one or both of the electrodes are porous or non-porous. The buffer layer is described as comprising a spacer or spacing element, which acts to maintain a physical gap between the membrane and the first electrode (or surrogate). In certain embodiments, the buffer layer also comprises an aqueous solution comprising a pH buffer. In certain of these embodiments, especially those in the context of a redox flow battery, where the membrane electrode assembly is in fluidic communication with a working electrolyte, the pH buffer solution may comprise the working electrolyte, for example, the negolyte, so that the buffer solution contains the same buffer as the working electrolyte (e.g., negolyte).

In additional embodiments, the first electrode comprises a an allotrope of carbon, preferably a woven or non-woven mat comprising an allotrope of carbon, more preferably a carbon cloth. The composition of the electrode is actually quite flexible, and in many cases the choice of material is driven at least as much by cost considerations as by physical characteristics. In other embodiments, the first electrode may also comprise carbon felt, paper, graphite composites, and non-reactive solid metals, such as Pt, Pd, Ti, or Au, or alloys or composites comprising these materials. Other suitable metals may include Ta, Nb, Fe, Sn, Zn, Hg, Cd, W, Mo, and amalgams, chalcogenides, pnictides (which include nitrides and phosphides) and carbides thereof.

The buffer layer has been described as comprising a physical spacer. This structural material provides the necessary physical integrity for maintaining a fixed separation distance between the membrane and the first electrode or surrogate. The spacer should be electrically non-conductive, to prevent shorting between the two electrodes. The spacer should also be porous, to allow flow of the aqueous pH buffer solution through it (again, as described elsewhere herein, the buffer layer may also comprise an aqueous buffer solution). Materials which meet these criteria include porous organic polymers or inorganic glass or other inorganic materials. Such materials can be formed of porous solid bodies, by arrays of fibers, or a combination of both. Exemplary forms include three-dimensionally porous polymers (e.g., foams), arrays (e.g., woven or non-woven cloth) of organic or inorganic polymers, inorganic (e.g., silica) aerogels or a combination thereof. The structural materials may also comprise polymer or glass coated conductive material woven, non-woven, felts, papers, polymer foams. In some embodiments, polymeric or other pH buffers may be attached to, or incorporated into these physical spacers. Such polymers containing pH buffering agents are described, for example, in U.S. Pat. No. 6,992,127, which is incorporated by reference herein at least for these teachings.

With respect to the specific degree of spacing, there is no individually preferred a priori distance, but in certain embodiments, the buffer layer provides a spacing between the first electrode and the membrane of a distance in a range of from about 10 microns to about 1000 microns, preferably from 50 microns to 500 microns. In alternative embodiments, the spacing is in a range of from about 5 to 10 microns, from 10 to 20 microns, from 20 to 30 microns, from 30 to 40 microns, from 40 to 50 microns, from 50 to 60 microns, from 60 to 70 microns, from 70 to 80 microns, from 80 to 90 microns, from 90 to 100 microns, from 100 to 200 microns, from 200 to 300 microns, from 300 to 400 microns, from 400 to 500 microns, from 500 to 600 microns, from 600 to 700 microns, from 700 to 800 microns, from 800 to 900 microns, or from 900 to 1000 microns, or the spacing dimension may be described in terms of two or more of these ranges. For a given device, and it is also possible to use spacers that are larger or smaller than these range. The spacer works best when it provides a uniform distance from the membrane, and is open enough to allow conductive and diffusive flow to the membrane. Lateral variances (i.e., thickness variances within the area of the buffer layer) of less than 1% to 10% of the mean are preferred, but in some embodiments, these variances may also be less than 5%, 10%, 20%, 30%, 40%, or 50% may, in some cases, be acceptable. When used in the context of a flow battery, the operating current density of the balancing cell, and so the number of protons and electrons being generated by the second electrode, will define the optimal dimensions. Again, in the context of a redox flow battery, the negolyte solution, diffusing through the porous, first electrode, provides the buffer solution to the buffer layer.

As with the first electrode, the composition of the second electrode is forgiving. In some embodiments, the composition of the second electrode is preferably resistant to corrosion under low pH (e.g., less than about 7; i.e., acidic) conditions. In other embodiments, the electrode composition may be chosen as a sacrificial material under these pH conditions. In some embodiments, the second electrode comprises an allotrope of carbon, for example a woven or non-woven mat comprising an allotrope of carbon, preferably a carbon cloth, graphitic carbon, glassy carbon, amorphous carbon, carbon doped with boron or nitrogen, diamond-like carbon, carbon onion, carbon nanotubes, carbon felt, carbon paper, or graphene. In some preferred embodiments, the second electrode uses a carbon/iridium coating on the membrane.

The catalyst for the generation of oxygen ($O_2$) on the second electrode is described as being suitable for the electrochemical generation of oxygen from water, preferably a metal oxide catalyst. Such catalysts are suitably effective at low pH (e.g., less than a pH of 7). In other embodiments, the catalyst may be effective for the generation of oxygen under alkaline conditions (e.g., pH greater than about 7). In certain specific embodiments, the catalyst comprises an oxide, fluoride, or oxyfluoride of cobalt, iridium, iron, manganese, nickel, ruthenium, indium, tin or a combination thereof. In preferred embodiments, the catalyst for the generation of oxygen ($O_2$) comprises an oxide of iridium, an oxide of nickel, or an oxide of a nickel-iron alloy. The catalyst may be present on the electrode itself, or may be dispersed on a membrane within a binder such as a perfluorosulfonated polymer, such as Nafion® polymers In some embodiments, these catalysts can be used in concert with acidic electrolytes in a balancing cell (where protons and electrons are generated). In other embodiments, these catalysts can be used in concert with alkaline electrolytes (where hydroxide and electrons are generated). Complementary disclosures describing the associated electrochemistry are provided elsewhere herein in the context of the balancing cells.

The membrane of the membrane electrode assembly typically, but not necessarily, comprises an ion exchange membrane. In some embodiments, the ion exchange membrane is or comprises a cation exchange membrane, or more specifically, a proton exchange membrane. But in other embodiments, the ion exchange membrane is or comprises an anion exchange membrane. While the ion exchange membrane may comprise Nafion® perfluorosulfonic acid membranes, they may also comprise any of the various types of membranes described elsewhere herein. Depending on the specific configuration or type of electrolytes, the membranes may be single, bi-, or poly-layer membranes as described elsewhere herein. Multiple layers may be used, for example, to mitigate cross-over of negolyte in certain redox flow battery configurations.

In certain embodiments, the membrane comprises a bipolar membrane, which is a bi-membrane consisting of one cation exchange and one anion exchange ionomer membrane. Between these two layers, a metal oxide film is present that facilitates water dissociation. When a sufficiently high voltage is applied across this composite membrane, water is dissociated at the metal oxide layer, and as-generated protons migrate to the negative electrode whereas as-generated hydroxide ions migrate to the positive electrode. Using a bipolar membrane, the balancing cell can be operated while deploying a basic electrolyte in the second half-chamber.

Additional embodiments corresponding to the balancing cell alone are also within the scope of this disclosure. The following discussion with respect to balancing cells is intended to complement the discussion related to the membrane electrode assemblies, and vice versa, such that descriptions of one is intended also to refer to the other.

In certain embodiments, the present disclosure is directed to balancing cells, which may also be characterized as electrochemical rebalancing cells. See FIG. 1. In either case, the purpose of the balancing cell is to generate electrons and protons, for delivery to the working electrolyte via an appropriate ion exchange membrane, with the concomitant generation of oxygen. That is, the electrochemistry associated with the second half-cell of the balancing cell at acidic or neutral pH values may be described in terms of Equation (1):

$$2H_2O \rightarrow 2O_2 + 4H^+ + 4e^- \quad (1)$$

At more basic pH values, the electrochemistry associated with the second half-cell of the balancing cell may be described in terms of Equation (2):

$$4OH^- \rightarrow 2H_2O + O_2 + 4e^- \quad (2)$$

Figure 2:
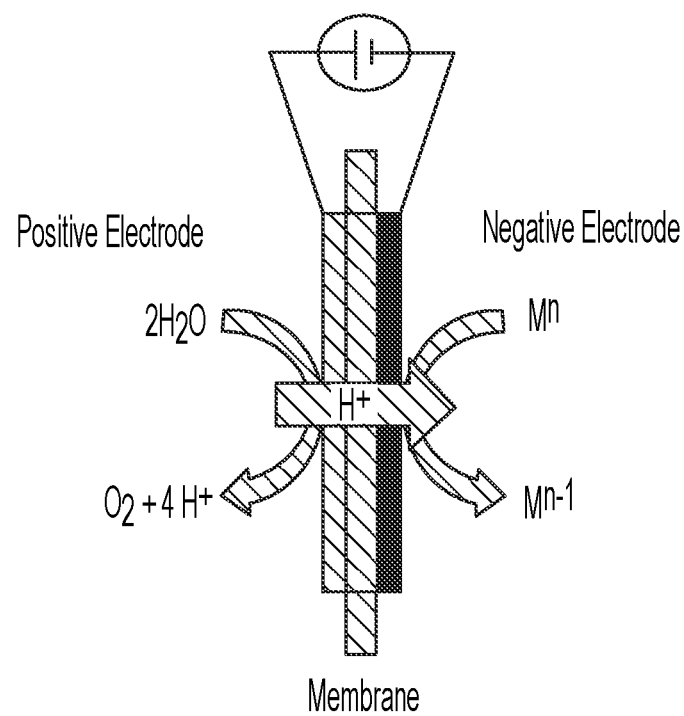
FIG. 2 provides a schematic of one embodiment of an electron balancing and pH correction cell of the present invention. $M^n$ may be the charged form of the positive electrolyte or the discharged form of the negative electrolyte in the flow battery.

The corresponding electrochemical reactions associated with the first half-cell (corresponding to that of the working electrolyte) of the pH correction may be described in Equation (3):

$$M^n + e^- \rightarrow M^{n-1} \quad (3)$$

where $M^n$ and $M^{n-1}$ represent the redox active species in the working electrolyte, typically the negolyte. Note that the transport of protons through the membrane from the second to first half-cell of the pH correction cell provides a charge balance to the negolyte. See FIG. 2.

Accordingly, the balancing cell of the instant disclosure comprise the membrane electrode assemblies described elsewhere herein. In such embodiments, the balancing cell further comprises a half-cell chamber, wherein the second, preferably porous, electrode forms part of a wall of the half-chamber. This half-cell chamber may also be described herein as a second half-cell chamber, where the use of the working electrolyte corresponds to the first half-cell chamber of the balancing cell.

In certain embodiments, this half-cell chamber of the balancing cell further comprises a second electrolyte in fluid communication with the second electrode. Typically, this second electrolyte in fluid communication with the second, preferably porous electrode has a pH in a range of from 0 to 7. In other embodiment, the pH of this electrolyte is in a range of from 0 to 1, from 1 to 2, from 2 to 3, from 3 to 4, from 4 to 5, from 5 to 6, or from 6 to 7, or may be described in terms of two or more of these ranges. The second electrolyte is typically substantially free of metallic materials, including organometallic or metal-ligand coordination compounds, but in other embodiments, the second electrolyte may contain some of these materials. As used herein, the term "substantially free" refers to a condition wherein the electrolyte contains no deliberately added such metallic, organometallic, or metal-ligand coordination compounds, but may contain such materials as materials that have crossed over through the membrane during use of the devices.

In certain embodiments, the balancing cells are configured to be in fluid communication with either the positive or negative electrolytes of the flow battery. In some embodiments, they are configured to be in fluid communication with the negative working electrolyte (i.e., the negolyte) of the redox flow battery, through or around the first electrode. such that the negolyte composition forms at least a part of the buffer layer solution.

As described elsewhere in the context of the membrane assemblies, in some embodiments, the membranes preferentially conduct protons, to the virtual exclusion of other soluble materials. Alternatively, or additionally, the membranes may be matched with the redox active materials to as to further exclude the latter, for example by size, charge, equivalent weight, or chemical functionality. Suitable membranes may be composed of an ionomeric polymer. Such polymers may comprise perfluorosulphonic acid, (e.g. Nafion®). Other suitable membranes types are described herein.

In some embodiments, the second aqueous electrolyte may comprise an aqueous solution with a certain ionic strength, which may be selected so as to control the transport of water across the membrane of the balancing cell. The ionic strength of the second aqueous electrolyte may be tuned to influence the activity of water in the second aqueous electrolyte and, therein, control the osmotic flux of water across the membrane. It may be preferred for water to migrate from the second aqueous electrolyte to the negolyte or from the negolyte to the second aqueous electrolyte. The ionic strength may be selected such that the osmotic flux matches the rate at which water is consumed in the production of $O_2$. In some embodiments, the ionic strength of the second aqueous electrolyte may be selected to yield an osmotic flux that is essentially zero.

Also as described above, the second electrode comprises a catalyst for the generation of $O_2$. In certain of these embodiments, the second electrode comprises a metal oxide catalyst, said metal oxide catalyst being suitable for the electrochemical generation of $O_2$ from water. In addition to the ability to generate $O_2$, these oxidation catalysts preferably resist corrosion under the pHs considered in this application, are poor catalysts for the reduction of water to hydrogen, or both. Catalysts which corrode under the acidic or basic oxidizing conditions of the operating second aqueous electrolyte of the pH correction cell have the potential to cross-over to the first pH correction half-cell, interfering with either the intended effect of the pH correction cell or, worse, with the operation of the flow battery. If such cross-over catalysts are further efficient catalysts for the generation of hydrogen under the reducing conditions of the first half-cell, one can envision scenarios where the evolution of hydrogen in the first half-cell or at the negative electrode of the working flow battery causes safety concerns. Accordingly, the present invention contemplates the preferred use of oxides of cobalt, iridium, iron, manganese, nickel, ruthenium, tin, or a combination thereof in the second electrode. Iridium oxide is especially preferred, because of its good catalytic activity toward $O_2$ evolution and its high corrosion resistance. In case the second half-chamber comprises an alkaline electrolyte, catalysts such as nickel oxide or nickel-iron oxide are especially preferred because of their good catalytic activity toward $O_2$ evolution and their high corrosion resistance in base.

In some embodiments, the second electrode of the balancing cell comprises carbon. Such electrodes are well known in the art and include graphitic carbon, glassy carbon, amorphous carbon, carbon doped with boron or nitrogen, diamond-like carbon, carbon onions, carbon nanotubes, carbon felt, carbon paper, and graphene. Carbon materials are capable of evolving $O_2$, albeit at rather high overpotentials, but it is inevitable that the carbon electrode itself will be oxidized into $CO_2$. As such, the carbon electrodes are semi-sacrificial of nature.

In some embodiments, the balancing cell is used to balance pH and SOC for a flow battery comprising metal-ligand coordination compounds as redox-active materials. Traditional flow batteries (e.g. all-Vanadium, iron-chrome, etc.) often operate under strongly acidic conditions, but flow batteries based on organometallic or metal-ligand coordination compounds may operate under neutral or alkaline pH conditions. Each coordination compound exhibits optimal electrochemical reversibility, solubility, and chemical stability at a specific pH value, hence the optimal pH window of operation is different for each coordination compound-based flow battery, depending what active materials are being used. A number of different considerations have to be taken into account when designing a balancing cell aimed at balancing a coordination compound flow battery (CCFB) that operates at weakly acidic, neutral or alkaline pH.

First all, pH control is more important in CCFB's than in traditional, strongly acidic, flow batteries. The latter flow batteries typically operate in 1-5M strong acid (e.g. $H_2SO_4$, wherein the pH of the electrolytes is 1 or below), so that small imbalances in proton concentration will not significantly alter the pH of the main flow battery. In contrast, when a CCFB is operated at, for instance, pH 11, a relatively small build-up or depletion of protons may lead to significant pH changes, potentially affecting the battery performance by reduced electrochemical reversibility, solubility or chemical degradation of the coordination compounds.

Secondly, the use of strongly acidic electrolyte in the second half-chamber can lead to a large pH gradient across the membrane of the balancing cell, especially where the working electrolyte of the redox flow battery is operated at neutral or alkaline pH. The presence of large pH gradients may eventually lead to pH equilibration, effectively causing acidification of the electrolyte in the first half-chamber, which may be highly undesirable from the point of view of stable operation, as mentioned above. Hence, operation of the main battery at e.g. pH 11 may require the electrolyte in the second half-chamber of the balancing cell to be alkaline for long-term stable operation, impacting the selection of the water oxidation catalyst and the ionomer material for the membrane separator. In such circumstances, it is often necessary to operate any associated balancing cell at pH values more in line with those of the electrolytes.

The use of the inventive spacers and associated aqueous buffer solutions in the buffer layer described in this disclosures ameliorates or eliminates many of the problems of such systems. Further disclosures related to these benefits are described elsewhere herein.

Thirdly, active material cross-over in the balancing may reduce long-term performance of the main battery. In case anionic organometallic or coordination complexes may be used in the main flow battery, these molecules may be transported from the first half-chamber of the balancing cell to the second half-chamber by means of migration. One side effect of this unintended cross-over of anions is that, in order to fulfill charge balancing, fewer protons need to be transported from the second to the first half-chamber of the balancing cell, compromising the pH balancing function of the balancing cell. A second side effect of cross-over of coordination compounds is that these molecules may deposit within the membrane, increasing the membrane resistance. A third side effect of cross-over of coordination compounds is that these molecules may be oxidized at the catalyst in the second half-chamber, and the oxidation products of this reaction may foul and/or deactivate the catalyst. Hence, prevention of cross-over of coordination compound active materials may be essential in certain embodiments.

Cross-over of active material may be minimized by intelligently selecting the configuration and/or composition of the separator material, as described above. Various membranes or membrane combinations may be selected for the membrane electrode assembly and the balancing cell to address these potential issues. In some embodiments, standard membranes based on perfluorosulphonic acid or sulfonated polymers or co-polymers of tetrafluoroethylene, optionally comprising perfluorovinyl ethers may be used. Other exemplary perfluorinated membrane materials include copolymers of tetrafluoroethylene and one or more fluorinated, acid-functional co-monomers, which are commercially available as Nafion® perfluorinated polymer electrolytes from The Chemours Company FC, LLC, Wilmington Del. Other useful perfluorinated electrolytes comprise copolymers of tetrafluoroethylene (TFE) and

$$FSO_2-CF_2CF_2CF_2CF_2-O-CF=CF_2.$$

In certain embodiments, however, membranes with a higher selectivity may be required. In some embodiments, it is helpful to precipitate metals, metal oxides, organometallic material, polymeric material, or a combination thereof. Such methods and materials are known in the art to improve membrane selectivity, for example by acting as a barrier for ions having large volumes (such as organometallic, or other metal-ligand coordination, compounds).

In other embodiments, a membrane specifically modified to suppress cross-over may be utilized. One attractive class of such membranes includes ionomer membranes, especially melt-extruded ionomer membranes based on the unique Short Side Chain (SSC) copolymer of Tetrafluoroethylene and a Sulfonyl Fluoride Vinyl Ether (SFVE) $F_2C=CF-O-CF_2CF_2-SO_2F$ of low molecular weight, commercially available as Aquivion™ PFSA. Aquivion™ membranes with low equivalent weight (980EW, 870EW, or lower) are especially preferred. These membranes, modified or as provided, can be used on their own, or it can be combined with more traditional membranes (e.g. N117, see Example 3).

The balancing cell may be operated in a flow-through or batchwise arrangement. In preferred embodiments, at least the first half-cell chamber and optionally the second half-cell chamber is configured as a flow-through cell.

This disclosure also provides embodiments in which the second half-chamber of the balancing cell does not contain any aqueous electrolyte at all. In this configuration, the water required for the $O_2$ evolution reaction is provided by water from the aqueous working electrolyte that is transported across the membrane. To avoid the situation of mass transport limitations, the water transport across the membrane needs to be faster than the consumption of water at the metal oxide catalyst. The membrane on the side of the second half-chamber can be coated with a metal oxide $O_2$ evolution catalyst (e.g. $IrO_x$) as a result of which water that is transported from the first half-chamber across the membrane is directly oxidized into molecular oxygen and protons. This configuration may greatly simplify the design of the balancing cell. For instance, the metal oxide catalyst on the membrane can be directly interfaced with the titanium endplate, omitting the need for the titanium meshes that act as a flow field for the second aqueous electrolyte. Furthermore, the balance of plant would be significantly simplified because the pump, tubing, and flow meters associated with the second half-chamber can be omitted. The only additional design feature would be a vent for the molecular oxygen that is evolved at the metal oxide catalyst. Furthermore, water would have to be added periodically to the negolyte electrolyte tank to compensate for water that is consumed in the $O_2$ evolution reaction. Optionally, this make-up water can be produced in-situ by combining the evolved $O_2$ from the second half-chamber with the $H_2$ evolved in the second half-chamber of the balancing cell and in the negolyte compartment of the main cell. This water production process may be catalyzed by a noble metal catalyst (e.g. Pt, Pd, etc).

More broadly speaking, the membrane electrode assembly and the balancing cell is part of a redox flow battery configuration, preferably where the balancing cell is in fluid communication with the negolyte. In these embodiments, the aqueous working electrolyte (e.g., the negolyte) comprises a pH buffer. In certain embodiments, the aqueous working electrolyte is buffered to an alkaline pH in the range of from 0 to 14, preferably from 7 to 14. In other embodiments, the operative pH of the working electrolyte is in a range of from 0 to 1, from 1 to 2, from 2 to 3, from 3 to 4, from 4 to 5, from 5 to 6, from 6 to 7, from 7 to 7.5, from 7.5 to 8, from 8 to 8.5, from 8.5 to 9, from 9 to 9.5, from 9.5 to 10, from 10 to 10.5, from 10.5 to 11, from 11 to 11.5, from 11.5 to 12, from 12 to 12.5, from 12.5 to 13, from 13 to 13.5, or from 13.5 to 14, or the pH may be defined in terms of two or more of these ranges. For example, in exemplary embodiments, the working electrolyte/negolyte is buffered to an alkaline pH range of from about 8 to about 12.5, or preferably from about 9 to about 12.5.

Similarly, or alternatively, the pH gradient across the membrane of the membrane electrode assembly/balancing cell is in a range of from 2 to 3, from 3 to 4, from 4 to 5, from 5 to 6, from 6 to 7, from 7 to 8, from 8 to 9, from 9 to 10, from 10 to 11, from 11 to 12, from 12 to 13, or from 13 to 14 pH units, or the gradient may be defined by two or more of these ranges.

In certain embodiment, the aqueous working electrolyte also contain supporting electrolytes, viscosity modifiers, wetting agents, and the like.

The pH buffer of the negolytes typically comprises a salt of phosphate, borate, carbonate, silicate, tris(hydroxymethyl)aminomethane, (4-(2-hydroxyethyl)-1-piperazine ethanesulfonic acid) (HEPES), piperazine-N,N'-bis(ethanesulfonic acid) (PIPES), or combination thereof. In certain embodiments, the buffer layer of the membrane electrode assembly and/or the balancing cell may also independently comprise one or more of these buffers. In preferred embodiments, the pH buffer of the aqueous working electrolyte and the pH buffer of the buffer layer of the membrane electrode assembly are the same, since the aqueous component of the buffer layer is derived from the aqueous working electrolyte.

As described elsewhere herein, in some embodiments, the balancing cell of the redox flow battery is further configured to provide water to the aqueous working electrolyte. In still other embodiments, either the buffer layer, the half-cell of the balancing cell, or both the buffer layer and the half-cell of the balancing cell are configured to permit flow-through the respective layer or half-cell.

The working electrolyte of the redox flow battery, in some embodiments, comprises a redox active material comprises an organometallic complex or other metal-ligand coordination compound comprising Al, Ce, Co, Cr, Fe, Mg, Mn, Mo, Sn, Ti, V, W, Zn, or Zr. In preferred aspects of this Embodiment, the negolyte comprises titanium, more preferably a titanium catecholate complex. More specific details of exemplary redox active materials are described elsewhere herein.

To this point, the invention has been described in terms of devices—membrane electrode assemblies, balancing cells, and redox flow batteries in fluid communication with at least one electrochemical balancing cell. However, this disclosure also contemplates the operation of such cells. Accordingly, additional embodiments provide methods of operating any of the flow batteries described herein, each method comprising applying an electric potential across said first and second electrodes of the membrane electrode assembly/balancing cell. In specific embodiments, the potential across these electrodes is maintained within about 500 mV of the overpotential voltage of the second aqueous electrolyte. In other independent embodiments, the potential across these electrodes is maintained within about 100 mV, about 250 mV, about 500 mV, or about 750 mV of the overpotential voltage of the second aqueous electrolyte. In still other embodiments, this potential may be more generally described as sufficient to generate oxygen, with the concomitant formation and transport of protons and electrons.

In further embodiments, the balancing cell devices may be incorporated into electrochemical devices, including fuel cells and flow batteries, which themselves are incorporated into larger systems, for example, including cell stacks, storage tanks and pipings for containing and transporting the electrolytes, control hardware and software (which may include safety systems), and at least one power conditioning unit as part of an energy storage system. In such systems, the storage tanks contain the electroactive materials. The control software, hardware, and optional safety systems include all sensors, mitigation equipment and electronic/hardware controls and safeguards to ensure safe, autonomous, and efficient operation of the flow battery or other energy storage system.

Such storage systems may also include a power conditioning unit at the front end of the energy storage system to convert incoming and outgoing power to a voltage and current that is optimal for the energy storage system or the application. For the example of an energy storage system connected to an electrical grid, in a charging cycle the power conditioning unit would convert incoming AC electricity into DC electricity at an appropriate voltage and current for the electrochemical stack. In a discharging cycle the stack produces DC electrical power and the power conditioning unit converts to AC electrical power at the appropriate voltage and frequency for grid applications. Such energy storage systems of the present invention are well suited to sustained charge or discharge cycles of several hour durations. As such, the systems of the present invention are suited to smooth energy supply/demand profiles and provide a mechanism for stabilizing intermittent power generation assets (e.g. from renewable energy sources). It should be appreciated, then, that various embodiments of the present invention include those electrical energy storage applications where such long charge or discharge durations are valuable. For example, non-limiting examples of such applications include those where systems of the present invention are connected to an electrical grid include renewables integration, peak load shifting, grid firming, baseload power generation/consumption, energy arbitrage, transmission, weak grid support, and/or frequency regulation. Additionally the devices or systems of the present invention can be used to provide stable power for applications that are not connected to a grid, or a micro-grid, for example as power sources for remote camps, forward operating bases, off-grid telecommunications, or remote sensors.

Terms

Throughout this specification, words are to be afforded their normal meaning, as would be understood by those skilled in the relevant art. However, so as to avoid misunderstanding, the meanings of certain terms will be specifically defined or clarified.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range, including decimal values.

When a list is presented, unless stated otherwise, it is to be understood that each individual element of that list, and every combination of elements in that list, is a separate embodiment. For example, a list of embodiments presented as "A, B, or C" is to be interpreted as including the embodiments, "A," "B," "C," "A or B," "A or C," "B or C," "A, B, or C," or "A, B, and/or C."

Where embodiments described herein using the open-ended "comprising" language, such embodiments may be interpreted as also including those embodiments which may be described in terms of "consisting essentially of" language, or simply "consisting of."

As used herein, the term "redox couple" is a term of the art generally recognized by the skilled electrochemist and refers to the oxidized (electron acceptor) and the reduced (electron donor) forms of the species of a given redox reaction. Similarly, the term "redox active metal ion" is intended to connote that the metal undergoes a change in oxidation state under the conditions of use. As used herein, the term "redox couple" may refer to pairs of organic or inorganic materials. As described herein, inorganic materials may include "metal ligand coordination compounds" or simply "coordination compounds" which are also known to those skilled in the art of electrochemistry and inorganic chemistry. A (metal-ligand) coordination compound may comprise a metal ion bonded to an atom or molecule. The bonded atom or molecule is referred to as a "ligand". In certain non-limiting embodiments, the ligand may comprise a molecule comprising C, H, N, and/or O atoms. In other words, the ligand may comprise an organic molecule, including heteroorganic molecules. Such compounds may be described as organometallic compounds. In some embodiments of the present inventions, the coordination compounds comprise at least one ligand that is not water, hydroxide, or a halide ($F^-$, $Cl^-$, $Br^-$, $I^-$), though the invention is not limited to these embodiments. Additional embodiments include those metal ligand coordination compounds described in U.S. patent application Ser. No. 13/948,497, filed Jul. 23, 2013, which is incorporated by reference herein in its entirety at least for its teaching of coordination compounds Unless otherwise specified, the term "aqueous" refers to a solvent system comprising at least about 98% by weight of water, relative to total weight of the solvent. In some applications, soluble, miscible, or partially miscible (emulsified with surfactants or otherwise) co-solvents may also be usefully present which, for example, extend the range of water's liquidity (e.g., alcohols/glycols). When specified, additional independent embodiments include those where the "aqueous" solvent system comprises at least about 55 wt %, at least about 60 wt %, at least about 70 wt %, at least about 75 wt %, at least about 80%, at least about 85 wt %, at least about 90 wt %, at least about 95 wt %, or at least about 98 wt % water, relative to the total solvent. It some situations, the aqueous solvent may consist essentially of water, and be substantially free or entirely free of co-solvents or other species. The solvent system may be at least about 90 wt %, at least about 95 wt %, or at least about 98 wt % water, and, in some embodiments, be free of co-solvents or other species. Unless otherwise specified, the term "non-aqueous" refers to a solvent system comprising less than 10% by weight of water, generally comprising at least one organic solvent. Additional independent embodiments include those where the "non-aqueous" solvent system comprises less than 50%, less than 40 wt %, less than 30 wt %, less than 20 wt %, less than 10%, less than 5 wt %, or less than 2 wt % water, relative to the total solvent.

The term "aqueous electrolyte" is intended to connote an aqueous solvent system comprising at least one material, typically ionic, whose electrical conductivity is higher than the solvent system without the material. In addition to the redox active materials, an aqueous electrolyte may contain additional buffering agents, supporting electrolytes, viscosity modifiers, wetting agents, and the like.

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to the reversible hydrogen electrode.

In the present invention, the negative electrode associated with the first aqueous electrolyte of the balancing cell may comprise the same or different materials than the negative electrode of the operating flow batteries, although they share a common electrolyte. By contrast, the positive electrode associated with the second aqueous electrolyte of the balancing cell will almost certainly comprise different materials than the positive electrode of the operating flow battery; in this case, the positive electrolyte of the flow battery will almost certainly be compositionally different, and physically separated from, the second electrolyte of the balancing cell.

As used herein, an "ionomer," refers to a polymer comprising both electrically neutral and a fraction of ionized repeating units, wherein the ionized units are pendant and covalently bonded to the polymer backbone. The fraction of ionized units may range from about 1 mole percent to about 90 mole percent, but may be categorized according to their ionized unit content. For example, in certain cases, the content of ionized units are less than about 15 mole percent; in other cases, the ionic content is higher, typically greater than about 80 mole percent. In still other cases, the ionic content is defined by an intermediate range, for example in a range of about 15 to about 80 mole percent.

For example, as used herein, the term "charged metal-ligand coordination complex," or simply "coordination complex," refers to those complexes comprising a zero or non-zero valence transition metal (i.e., an element having filled or unfilled d-orbitals, including members of groups 3 to 12 in the periodic table, as well as members of the lanthanide and actinide series), having coordinated ligands, wherein the combination of the metal and ligands presents a non-zero charge, as would be understood by the skilled artisan. Unless otherwise specified, the term "coordinated ligands" refers to any chemical moiety within the coordination sphere of the metal. However, additional independent embodiments provide that these coordinated ligands are individually inorganic, organic, or mixed inorganic/organic, and are monodentate, bidendate, polydentate, or a combination thereof. In certain embodiments, the coordination complex is an organometallic coordination compound, as generally understood by the person of skill in the art as a coordination compound having at least one organic ligand.

Also, unless otherwise specifically indicated, the term "counterion" is intended to connote those species whose formal charge sign is opposite to that of the coordination complex, and so is capable of balancing the charge of the metal-ligand coordination complex. Counterions include those species that can then stabilize or effect the formation of lattice crystals of the metal-ligand coordination complex. The term "formal charge" is used to reflect that, under certain conditions, the coordination complex and its associated counterions may exist in solution as ion pairs, rather than free ions, though this this association does not detract from the intended meanings The terms "negolyte" and "posolyte," generally refer to the electrolytes associated with the negative electrode and positive electrodes, respectively. As used herein, however, the terms "negolyte" and "posolyte" are reserved for the respective electrolytes of the flow battery. As contemplated herein, the negative working electrolyte (negolyte) of the flow battery comprises a coordination compounds or metal-ligand coordination compounds. Metal ligand coordination compounds may comprise at least one "redox active metal ion," at least one "redox inert metal ion," or both. The term "redox active metal ion" is intended to connote that the metal undergoes a change in oxidation state under the conditions of use. In specific embodiments, the negolyte comprises a metal ligand coordination complex having a formula comprising

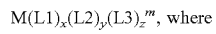

$M(L1)_x(L2)_y(L3)_z^m$, where

M is Al, Ca, Ce, Co, Cr, Fe, Mg, Mn, Mo, Si, Sn, Ti, V, W, Zn, or Zr;

L1, L2, and L3 are each independently ascorbate, an optionally substituted catecholate, citrate, a glycolate or polyol (including ligands derived from ethylene glycol, propylene glycol, or glycerol), gluconate, glycinate, α-hydroxyalkanoate (e.g., α-hydroxyacetate, or from glycolic acid), β-hydroxyalkanoate, γ-hydroxyalkanoate, malate, maleate, a phthalate, a pyrogallate, sarcosinate, salicylate, or lactate;

x, y, and z are independently 0, 1, 2, or 3, and $1 \leq x+y+z \leq 3$; and m is +1, 0, −1, −2, −3, −4, or −5.

Related and independent embodiments provide that (a) x=3, y=z=0; (b) x=2, y=1, z=0; (c) x=1, y=1, z=1; (d) x=2, y=z=0; or (e) x=1, y=z=0. In individual preferred embodiments, M is Al, Cr, Fe, or Ti and x+y+z=3. In more preferred embodiments, the negolyte comprises a metal-ligand coordination compound of titanium. In some aspects of this invention, L1 is catecholate. In some embodiments, L2 is one or more substituted catecholates, for example a hydroxycatecholate or a sulfonated catecholate.

As used herein, the term "solution" carries its normal meaning, as understood by one skilled in the art—i.e., homogeneous mixture of a solid dissolved in a liquid, which is preferably stable with respect to precipitation, at least under the operating and storage conditions of the described devices. However, as used herein, the term "solution" is not intended to be read as necessarily requiring the absence of other, non-dissolved materials, or a that the solution is the continuous phase of a mixture. That is, in the present context, a "(stable) aqueous solution" would also be present in a mixture comprising particles suspended within the (stable) aqueous solution and/or an emulsion or microemulsion in which the continuous or discontinuous phase comprises the (stable) aqueous solution.

Further, a (stable) aqueous electrolyte solution may, in addition to a redox active materials, further comprise other ionizing or non-ionizing materials, which make it more suitable for its intended application, but which do not interfere with the basic and novel characteristic of the invention. Ionizing materials (i.e., those with partially or completely ionize or form ion pairs in solution) may include, for example, supporting electrolytes (defined below), buffering agents, ionic (anionic, cationic, and zwitterionic) surfactants or detergents, and/or colligative property or pH adjusters. Exemplary ionizing materials include, but are not limited to, strong or weak acids (including hydrochloric, nitric, phosphoric, sulfuric, or carboxylic acids, such as acetic, citric, amino acids, or EDTA) and bases (including hydroxides, amines, and the conjugate bases of the aforementioned acids); alkali metal, alkaline earth metal, or ammonium salts; and salts of carboxylates (including acetic acid, citric acid, and EDTA), borates, halides (including bromide, chloride, fluoride, and iodide), nitrates, nitrites, sulfates, sulfites, phosphates, hydrogen phosphates, phosphites, polyphosphates. Exemplary buffering agents include acetic acid, bicine, cacodylate buffer, CHES (2-(cyclohexylamino)-ethanesulfonic acid), citric acid, HEPES (4-(2-hydroxyethyl)-1-piperazine-ethanesulfonic acid), IVIES (2-(N-morpholino)ethanesulfonic acid), MOPS (3-(N- morpholino)propanesulfonic acid), PIPES (piperazine-N,N'-bis(2-ethanesulfonic acid)), SSC (saline-sodium citrate buffer), TAPSO (3-[[1,3-dihydroxy-2-(hydroxymethyl)propan-2-yl]amino]-2-hydroxypropane-1-sulfonic acid), TRIS (2-amino-2-hydroxymethyl-propane-1,3-diol), and tricine The solutions may also contain non-ionizing materials, for example non-ionic co-solvents (including water miscible or soluble alcohols, including $C_{1-3}$ alcohols, glycols, or polyglycols; ketones; or aldehydes), viscosity modifiers or gelling agents (including citrate, corn starch, corn syrup, gelatin, glycerol, guar gum, pectin), and/or wetting agents (including non-ionic surfactants and/or detergents).

While the invention includes embodiments where the (stable) solutions are alternatively alkaline, acidic, or substantially neutral, in certain preferred embodiments, the (stable) solutions of the coordination complexes are alkaline. As used herein, unless otherwise specified, the terms "alkaline" or "basic" refer to a solution having an apparent pH in excess of about 7. The term "apparent" is used to accommodate solvent systems that are free of or contain a co-solvent, but (in the latter case) which register a pH in excess of about 7 when interrogated with a pH meter (pH meter being exemplified by a device in which a voltmeter measures the potential difference between a reference electrode and a sense electrode held in ionic contact with the solution of interest). While the terms "alkaline" or "basic" refer to a solution having an apparent pH in excess of 7, other embodiments of the invention include those where the pH or apparent pH is in the range of about 7 to about 14, and those where the pH or apparent pH is nominally greater than 14 (i.e., highly alkaline systems—including multi-molar (e.g., 2 M) hydroxides). Additional independent embodiments also include those solutions in which the pH is in a range of from about 7 to about 7.5, from about 7.5 to about 8, from about 8 to about 8.5, from about 8.5 to about 9, from about 9 to about 9.5, from about 9.5 to about 10, from about 10 to about 10.5, from about 10.5 to about 11, from about 11 to about 11.5, from about 11.5 to about 12, from about 12 to about 12.5, from about 12.5 to about 13, from about 13 to about 13.5, from about 13.5 to about 14, or higher, or the pH range may be defined in terms of two or more of these ranges.

As used herein, unless otherwise specified, the term "substantially reversible couples" refers to those redox pairs wherein the voltage difference between the anodic and cathodic peaks is less than about 0.3 V, as measured by cyclic voltammetry, using an ex-situ apparatus comprising a flat glassy carbon disc electrode and recording at 100 mV/s. However, additional embodiments provide that this term may also refer to those redox pairs wherein the voltage difference between the anodic and cathodic peaks is less than about 0.2 V, less than about 0.1 V, less than about 0.075 V, or less than about 0.059 V, under these same testing conditions. The term "quasi-reversible couple" refers to a redox pair where the corresponding voltage difference between the anodic and cathodic peaks is in a range of from 0.3 V to about 1 V. Other embodiments provide that "substantially reversible couples" are defined as having substantially invariant (less than 10% change) peak separation with respect to scan rate.

The term "stack" or "cell stack" or "electrochemical cell stack" refers to a collection of individual electrochemical cells that are in electrically connection. The cells may be electrically connected in series or in parallel. The cells may or may not be fluidly connected.

The term "state of charge" (SOC) is well understood by those skilled in the art of electrochemistry, energy storage, and batteries. The SOC is determined from the concentration ratio of reduced to oxidized species at an electrode ($X_{red}/X_{ox}$). For example, in the case of an individual half-cell, when $X_{red}=X_{ox}$ such that $X_{red}/X_{ox}=1$, the half-cell is at 50% SOC, and the half-cell potential equals the standard Nernstian value, $E°$. When the concentration ratio at the electrode surface corresponds to $X_{red}/X_{ox}=0.25$ or $X_{red}/X_{ox}=0.75$, the half-cell is at 25% and 75% SOC respectively. The SOC for a full cell depends on the SOCs of the individual half-cells and in certain embodiments the SOC is the same for both positive and negative electrodes. Measurement of the cell potential for a battery at its open circuit potential, and using Equations 2 and 3 the ratio of $X_{red}/X_{ox}$ at each electrode can be determined, and therefore the SOC for the battery system.

The devices of the present invention, including membrane electrode assemblies, rebalancing cells, those electrochemical cells which operate as a flow battery cell, and which take advantage of the present invention(s), may also be configured into larger systems, for example using a cell stack arrangement. Such systems, which include at least one electrochemical/flow battery cell as described herein, are considered additional embodiments of the present invention.

Also considered within the scope of the present invention are those methods useful for operating such a membrane electrode assembly, rebalancing cell, electrochemical cell/flow battery cell, or energy storage system.

ADDITIONAL ENUMERATED EMBODIMENTS

The following embodiments are intended to complement, rather than supplant, those embodiments already described.

Embodiment 1

A membrane electrode assembly comprising:
(a) a first, porous electrode;
(b) a buffer layer optionally comprising an aqueous solution comprising a pH buffer;
(c) a membrane; and
(d) a second, porous electrode comprising a catalyst for the generation of oxygen ($O_2$); wherein
the membrane is interposed between the first electrode and the second electrode, and
the buffer layer is interposed between the membrane and the first electrode.

In some aspects of this Embodiment, the first, porous electrode is absent (and the surface area of a bipolar plate is used as the electrode. In certain aspects, one or both of the electrodes are non-porous. In this Embodiment, the buffer layer is described as optionally comprising an aqueous solution comprising a pH buffer. That is, in certain aspects of this Embodiment, the buffer layer comprises at least a physical spacer between the membrane and the first electrode (or surrogate), but may also contain a pH buffer solution, which in operation of the flow battery generally comprises the working electrolyte, for example, the negolyte, and contains the same buffer as the negolyte Embodiment 2

The membrane electrode assembly of Embodiment 1, wherein the first electrode comprises a woven or non-woven mat comprising an allotrope of carbon, preferably the first electrode being a carbon cloth. In other aspects of this Embodiment, the first electrode may also comprise carbon felt, paper, graphite composites, and non-reactive solid metals, such as Pt, Pd, Ti, or Au, or alloys or composites comprising these materials.

Embodiment 3

The membrane electrode assembly of Embodiment 1 or 2, wherein the buffer layer comprises an electrically non-conducting, porous structural material. This structural material provides the necessary physical integrity for maintaining a fixed separation distance between the membrane and the first electrode or surrogate. Again, as described elsewhere herein, the buffer layer may also comprise an aqueous buffer solution.

Embodiment 4

The membrane electrode assembly of any one of Embodiments 1 to 3, wherein the porous structural material comprises a porous organic polymer or inorganic glass or other inorganic material, an array (e.g., woven or non-woven cloth) of organic or inorganic polymer, an inorganic aerogel, or a combination thereof. This structural material may also comprise polymer or glass coated conductive material woven, non-woven, felts, papers, polymer foams.

Embodiment 5

The membrane electrode assembly of any one of Embodiments 1 to 4, wherein the buffer layer provides a spacing between the first electrode and the membrane of a distance in a range of from about 10 microns to about 1000 microns, preferably from 50 microns to 500 microns. There is no individually preferred distance, for a given device, and it is possible to use spacers that are larger or smaller than this range. The spacer works best when it provides a uniform distance from the membrane, and is open enough to allow conductive and diffusive flow to the membrane. When used in the context of a flow battery, the operating current density of the balancing cell, and so the number of protons and electrons being generated by the second electrode, will define the optimal dimensions. Again, in the context of a redox flow battery, the negolyte solution, diffusing through the porous, first electrode, provides the buffer solution to the buffer layer.

Embodiment 6

The membrane electrode assembly of any one of Embodiments 1 to 5, wherein the second electrode comprises a woven or non-woven mat comprising an allotrope of carbon, preferably a carbon cloth. In certain aspects of this Embodiment, the second, porous electrode comprises graphitic carbon, glassy carbon, amorphous carbon, carbon doped with boron or nitrogen, diamond-like carbon, carbon onions, carbon nanotubes, carbon felt, carbon paper, or graphene. In some preferred aspects, the second electrode uses a carbon/iridium coating on the membrane.

Embodiment 7

The membrane electrode assembly of any one of Embodiments 1 to 6, wherein the catalyst for the generation of oxygen ($O_2$) comprises an oxide, fluoride, or oxyfluoride of cobalt, iridium, iron, manganese, nickel, ruthenium, indium, tin or a combination thereof. More generally, this catalyst can be described as being suitable for the electrochemical generation of oxygen from water, preferably a metal oxide catalyst. The $O_2$ side has a MEA and the electrode is a catalyst dispersed on the membrane within a binder such as Nafion. In some aspects, this can be used in concert with acidic electrolytes in the balancing cell (where protons and electrons are generated). In other aspects, this can be used in concert with alkaline electrolytes (where hydroxide and electrons are generated).

Embodiment 8

The membrane electrode assembly of any one of Embodiments 1 to 7, wherein the catalyst for the generation of oxygen ($O_2$) comprises an oxide of iridium, an oxide of nickel, or an oxide of a nickel-iron alloy.

Embodiment 9

The membrane electrode assembly of any one of Embodiments 1 to 8, wherein the membrane is an ion exchange membrane. In some aspect of this Embodiment, the ion exchange membrane is a cation or proton exchange membrane. In other aspects, the ion exchange membrane is an anion exchange membrane. In certain aspects of this embodiment, the ion exchange membrane comprises Nafion® perfluorosulfonic acid membranes, or any of the membranes—single, bi-, or poly-layer membranes as described elsewhere herein.

Embodiment 10

The membrane electrode assembly of any one of Embodiments 1 to 9, wherein the membrane comprises multiple layers.

Embodiment 11

A balancing cell comprising the membrane electrode assembly of any one of Embodiments 1 to 10, further comprising a half-cell chamber, wherein the second porous electrode forms part of a wall of the half-chamber.

Embodiment 12

The balancing cell of Embodiment 11, wherein the half-cell chamber further comprises a second electrolyte in fluid communication with the second, porous electrode.

Embodiment 13

The balancing cell of Embodiment 12, wherein the second electrolyte in fluid communication with the second, porous electrode has a pH in a range of from 0 to 7. Other aspects of this Embodiment include one or more of the pH ranges described elsewhere herein. Mother aspects of this Embodiment, the second electrolyte is substantially free of metallic materials, including organometallic or metal-ligand coordination compounds (i.e., contains no deliberately added such materials).

Embodiment 14

A redox flow battery comprising at least one electrochemical cell comprising an aqueous working electrolyte comprising a redox active material, the at least one electrochemical cell being in fluid communication with the first, porous electrode of the membrane electrode assembly of any one of Embodiments 1 to 10.

Embodiment 15

A redox flow battery comprising at least one electrochemical cell comprising an aqueous working electrolyte comprising a redox active material in fluid communication the first, porous electrode of the balancing cell of any one of Embodiments 11 to 13.

Embodiment 16

The redox flow battery of Embodiment 14 or 15, wherein the aqueous working electrolyte comprises a pH buffer. In certain aspects of this Embodiment, the aqueous working electrolyte is buffered to a pH in the range of from 0 to 14, preferably from 7 to 14. In certain aspects of this Embodiment, the aqueous working electrolyte may also contain supporting electrolytes, viscosity modifiers, wetting agents, and the like.

Embodiment 17

The redox flow battery of claim 16, wherein the pH buffer comprises a salt of phosphate, borate, carbonate, silicate, tris(hydroxymethyl)aminomethane, 4-(2-hydroxyethyl)-1-piperazine ethanesulfonic acid (HEPES), piperazine-N,N'-bis(ethanesulfonic acid) (PIPES), or combination thereof. In certain aspects of this Embodiment, the buffer layer of the membrane electrode assembly and/or the balancing cell may also independently comprise one or more of these buffers, independent of the presence of the other aspects of these other devices.

Embodiment 18

The redox flow battery of Embodiment 16 or 17, wherein the pH buffer of the aqueous working electrolyte and the pH buffer of the buffer layer of the membrane electrode assembly are the same.

Embodiment 19

The redox flow battery of any one of Embodiments 16 to 18, wherein the aqueous working electrolyte and the aqueous solution of the buffer layer of the membrane electrode assembly are the same.

Embodiment 20

The redox flow battery of any one of Embodiments 16 to 19, wherein the balancing cell is further configured to provide water to the aqueous working electrolyte.

Embodiment 21

The redox flow battery of any one of Embodiments 16 to 20, wherein the aqueous working electrolyte comprising the redox active material comprises a metal-ligand coordination compound or organometallic coordination compound comprising Al, Ce, Co, Cr, Fe, Mg, Mn, Mo, Sn, Ti, V, W, Zn, or Zr. In preferred aspects of the Embodiment, the negolyte comprises titanium, more preferably a titanium catecholate complex.

Embodiment 22

The flow battery of any one of Embodiments 16 to 21, wherein either the buffer layer, the half-cell of the balancing cell, or both the buffer layer and the half-cell of the balancing cell are configured to permit flow-through the respective layer or half-cell.

Embodiment 23

A method of operating a balancing cell of Embodiments 11 to 13 or a flow battery of any one of Embodiments 16 to 22, said method comprising applying an electric potential across said first and second electrodes, sufficient to generate oxygen.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1

Figure 3:
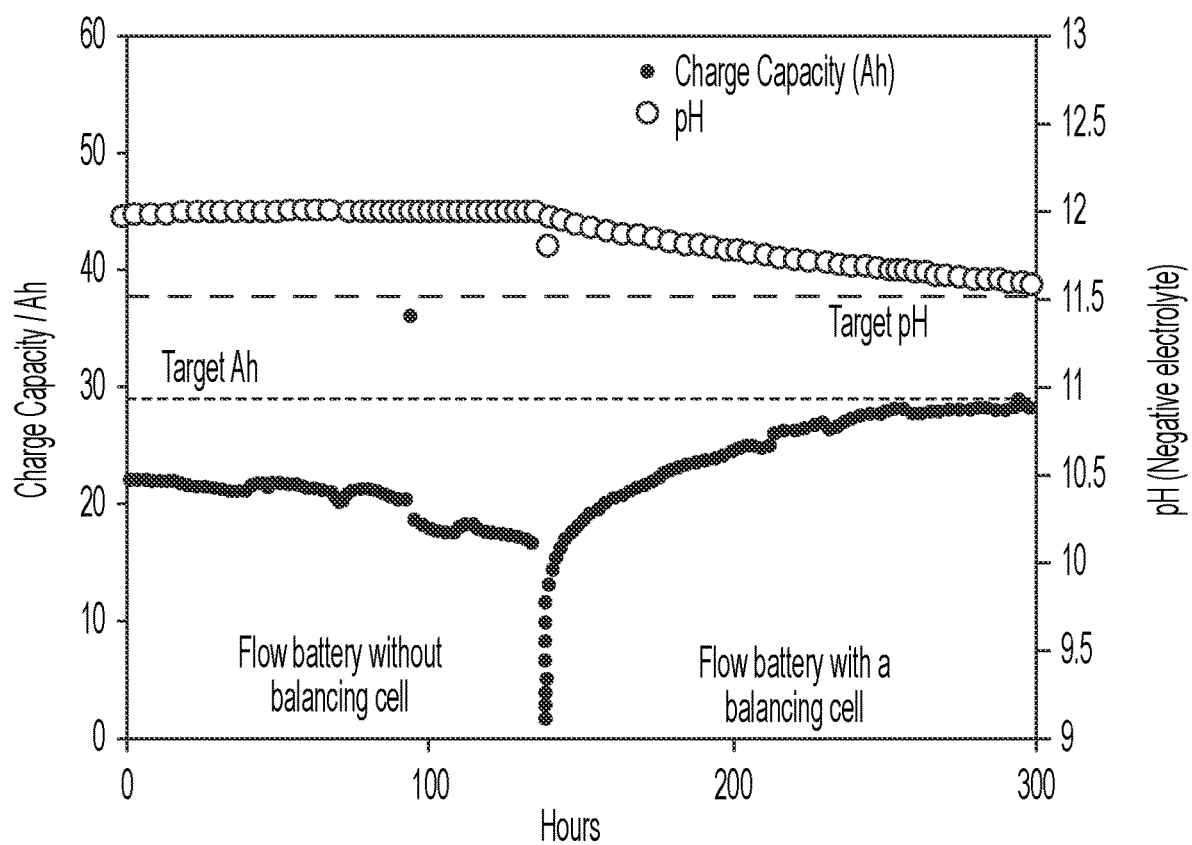
FIG. 3 provides data for flow battery cycle charge capacity and pH of negative electrolyte before and after initiation of the flow battery balancing cell. The vertical dashed line indicates the time at which the balancing cell is initiated (~125 hrs).
Figure 4:
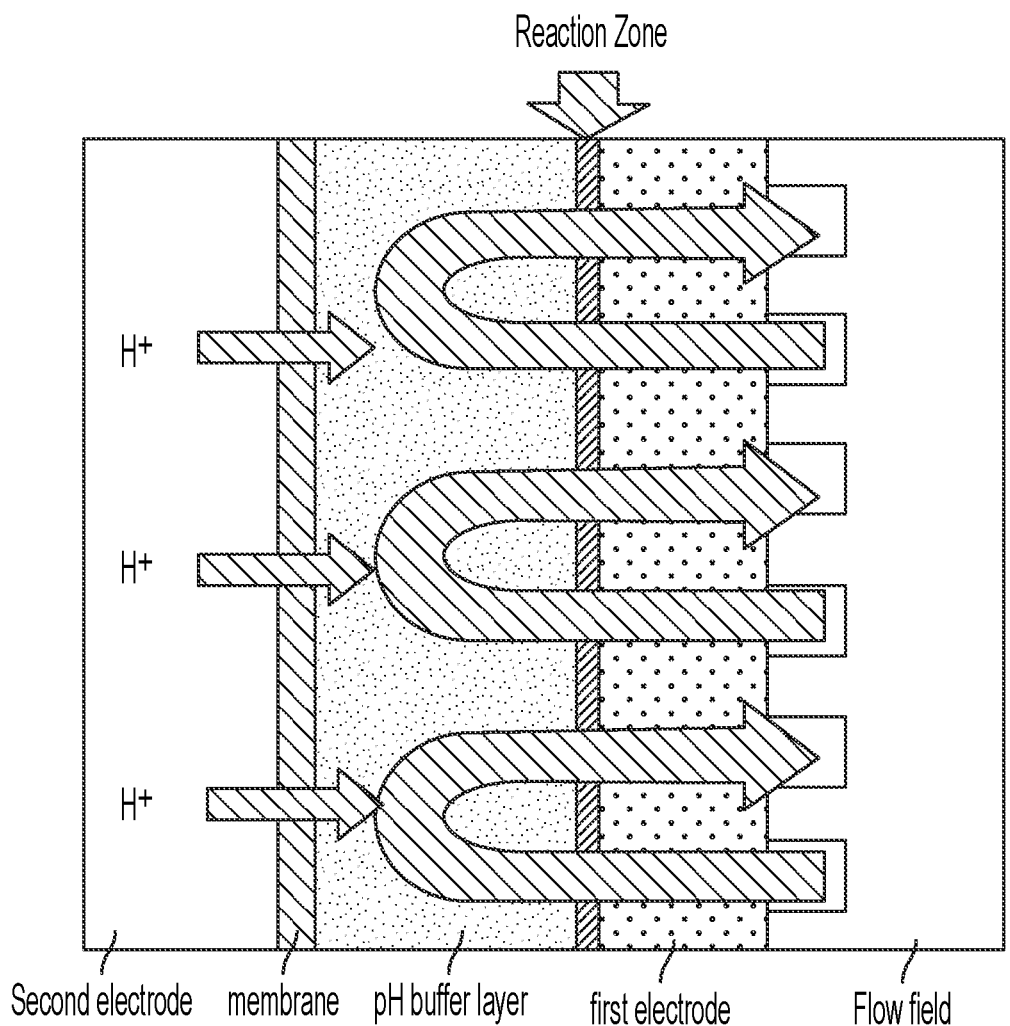
FIG. 4 provides schematic of one example of a membrane electrode assembly according to the instant disclosure.

A balancing electrochemical cell was constructed with a Nafion® 117 membrane, and an iridium oxide catalyst on the positive side with a metal oxide loading of not less than 1 mg/cm$^2$. The positive side of the membrane was supported with commercial titanium meshes (1.4 mm thick) and negative side was supported with a carbon paper (MGL 370, 350 microns thick), produced by Avcarb Material Solutions, Lowell, Mass. The carbon paper was supported by a flow field machined on commercially available graphite vinylester composite. The active area of the cell was 25 cm$^2$, and the overall cell area was 64 cm$^2$. A flow rate of approximately 50 cc/min of de-ionized water was maintained on the positive side. A flow rate of approximately 200 cc/min of negative flow battery electrolyte was maintained on the negative side. The balancing cell was operated at a current density of about 25 mA/cm$^2$, and a cell voltage of about 2.7 V. FIG. 3 illustrates the cycling capacity in Amp-hours (Ah) and the pH of the negative electrolyte as a function of operating time with and without a balancing cell. The target Ah for the battery system was about 30 Ah and the target negative electrolyte pH was about 11.5. At the beginning of the experiment, the system exhibits a state-of-charge and pH imbalance as illustrated by the pH of ~12 and the low charge capacity of ~22 Ah. As the system is operated, the imbalance continues as pH of the negative electrolyte continues to rise and the charge capacity continues to fall. The imbalance is corrected through initiation of the balancing cell at ~125 hrs (vertical dashed line in FIG. 3); the pH is seen to decrease toward the target value of 11.5 and the charge capacity of the negative electrolyte recovers to the target 30 Ah.

Figure 5A:
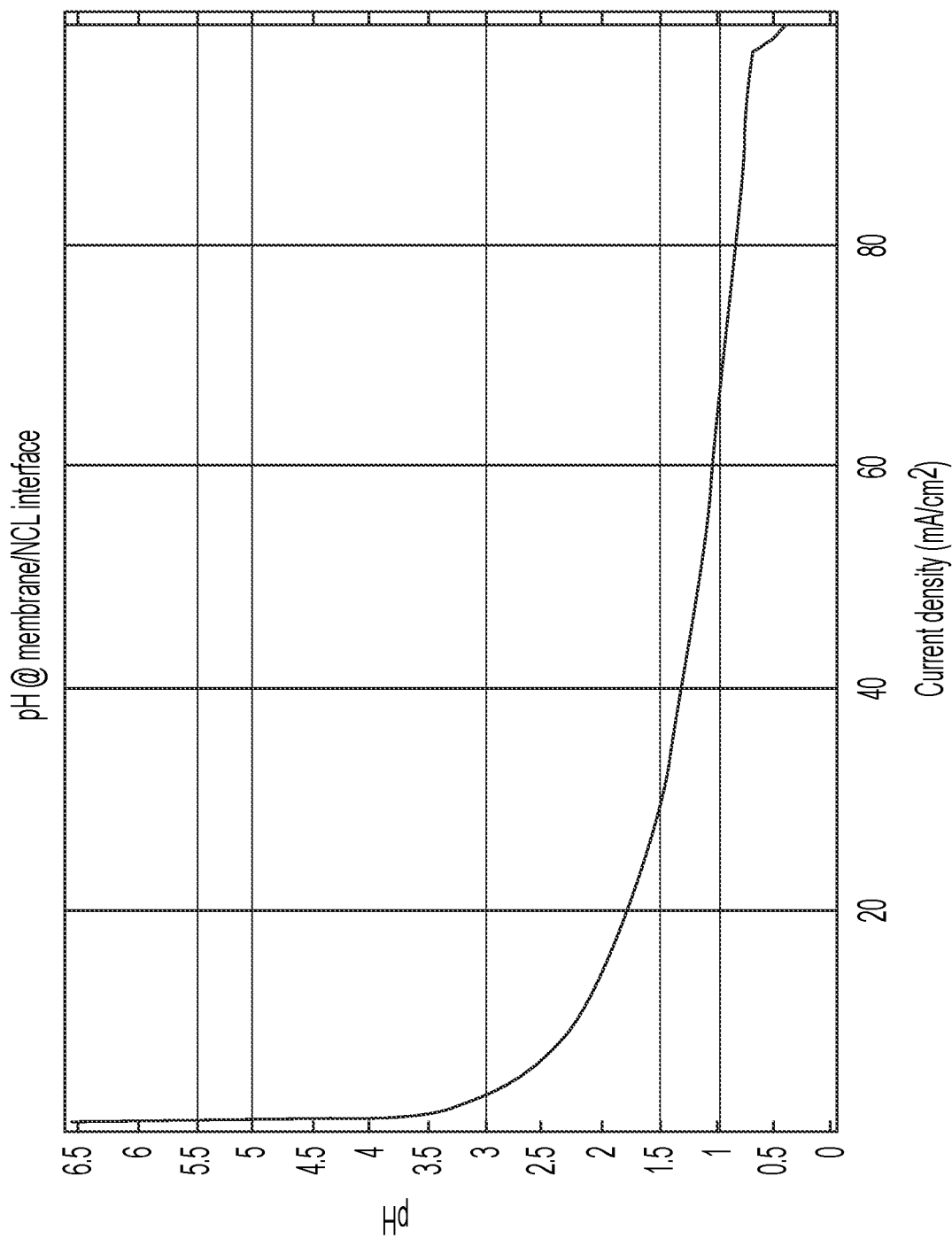
FIG. 5A shows data for a cell without the non-conducting layer and FIG. 5B shows data for a corresponding cell with the non-conducting layer.
Figure 5B:
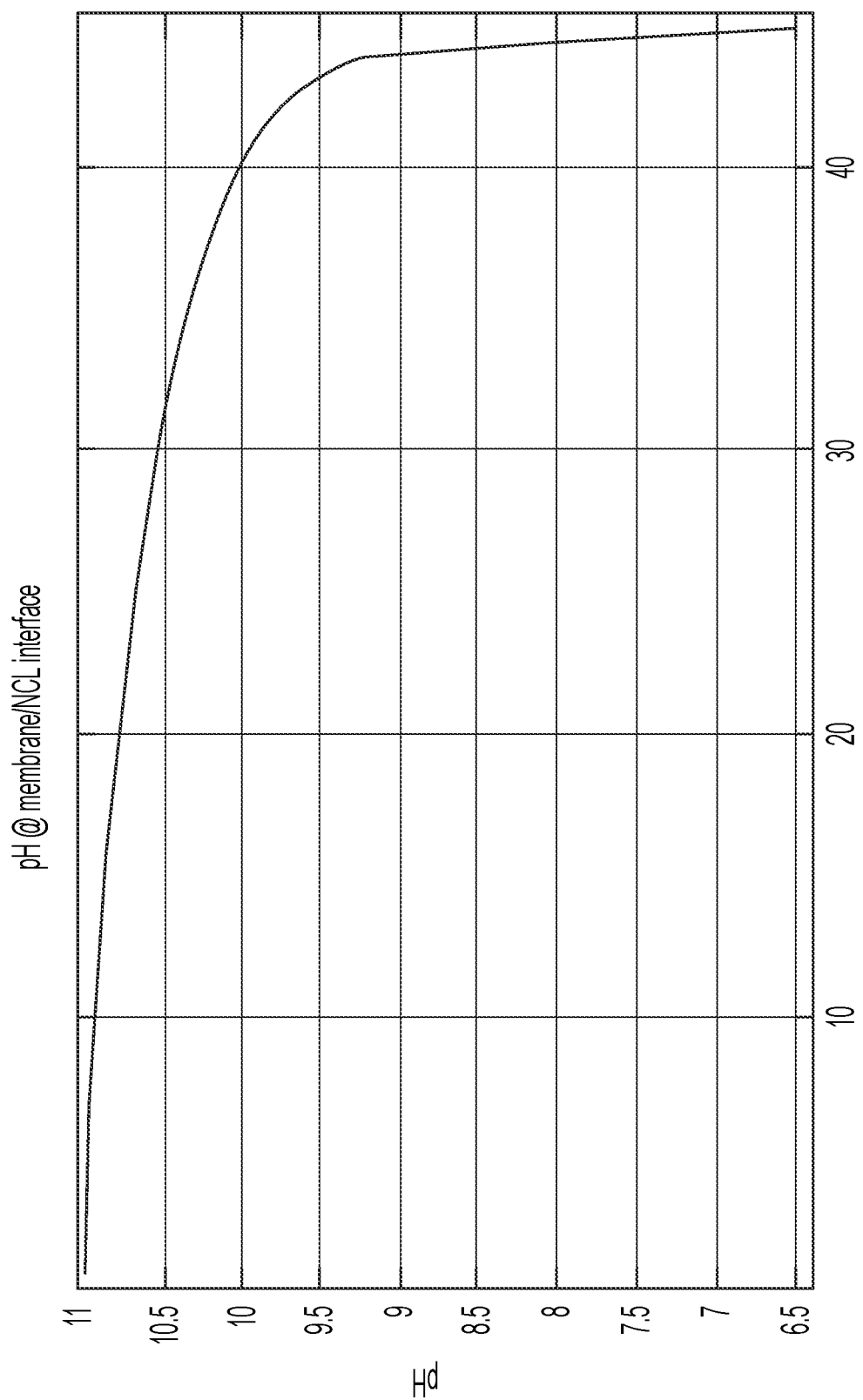

The effects of the presence of the non-conducting layer can be seen in FIGS. 5(A-B).

As those skilled in the art will appreciate, numerous modifications and variations of the present invention are possible in light of these teachings, and all such are contemplated hereby.

The disclosures of each patent, patent application, and publication cited or described in this document are hereby incorporated herein by reference, each in its entirety, for all purposes.

What is claimed:
1. A membrane electrode assembly comprising:
(a) a first porous electrode;

(b) a buffer layer comprising a spacer element and optionally comprising an aqueous solution comprising a pH buffer;

(c) a membrane; and (d) a second porous electrode comprising a catalyst for the generation of oxygen ($O_2$); wherein the membrane is interposed between the first porous electrode and the second porous electrode, and the buffer layer is interposed between the membrane and the first porous electrode.

2. The membrane electrode assembly of claim 1, wherein the first porous electrode comprises a woven or non-woven mat comprising an allotrope of carbon.

3. The membrane electrode assembly of claim 1, wherein the spacer element comprises an electrically non-conducting, porous structural material.

4. The membrane electrode assembly of claim 1, wherein the buffer layer comprises a porous organic polymer or inorganic glass or other inorganic material, an array of organic or inorganic polymer, an inorganic aerogel, or a combination thereof.

5. The membrane electrode assembly of claim 1, wherein the buffer layer provides a spacing between the first porous electrode and the membrane of a distance in a range of from about 10 microns to about 1000 microns.

6. The membrane electrode assembly of claim 1, wherein the second porous electrode comprises a woven or non-woven mat comprising an allotrope of carbon.

7. The membrane electrode assembly of claim 1, wherein the catalyst for the generation of oxygen ($O_2$) comprises an oxide, fluoride, or oxyfluoride of cobalt, iridium, iron, manganese, nickel, ruthenium, indium, tin or a combination thereof.

8. The membrane electrode assembly of claim 1, wherein the catalyst for the generation of oxygen ($O_2$) comprises an oxide of iridium, an oxide of nickel, or an oxide of a nickel-iron alloy.

9. The membrane electrode assembly of claim 1, wherein the membrane is an ion exchange membrane.

10. The membrane electrode assembly of claim 1, wherein the membrane comprises multiple layers.

11. A balancing cell comprising the membrane electrode assembly of claim 1, further comprising a half-cell chamber, wherein the second porous electrode forms part of a wall of the half-chamber.

12. The balancing cell of claim 11, the half-cell chamber further comprising a second electrolyte in fluid communication with the second, porous electrode.

13. The balancing cell of claim 12, wherein the second electrolyte in fluid communication with the second, porous electrode has a pH in a range of from 0 to 7.

14. A redox flow battery comprising at least one electrochemical cell comprising an aqueous working electrolyte comprising a redox active material, the at least one electrochemical cell being in fluid communication with the first, porous electrode of the membrane electrode assembly of claim 1.

15. A redox flow battery comprising at least one electrochemical cell comprising an aqueous working electrolyte comprising a redox active material in fluid communication the first, porous electrode of the balancing cell of claim 11.

16. The redox flow battery of claim 14, wherein the aqueous working electrolyte comprises a pH buffer and the aqueous working electrolyte is buffered to a pH in the range of from 7 to 14.

17. The redox flow battery of claim 16, wherein the pH buffer comprises a salt of phosphate, borate, carbonate, silicate, tris(hydroxymethyl)aminomethane, 4-(2-hydroxyethyl)-1-piperazine ethanesulfonic acid (HEPES), piperazine-N,N'-bis(ethanesulfonic acid) (PIPES), or combination thereof.

18. The redox flow battery of claim 16, wherein the pH buffer of the aqueous working electrolyte and the pH buffer of the buffer layer of the membrane electrode assembly are the same.

19. The redox flow battery of claim 16, wherein the aqueous working electrolyte and the aqueous solution of the buffer layer of the membrane electrode assembly are the same.

20. The redox flow battery of claim 16, wherein the balancing cell is further configured to provide water to the aqueous working electrolyte.

21. The redox flow battery of claim 16, wherein the aqueous working electrolyte comprising the redox active material comprises a metal-ligand coordination compound or organometallic coordination compound comprising Al, Ce, Co, Cr, Fe, Mg, Mn, Mo, Sn, Ti, V, W, Zn, or Zr.

22. The redox flow battery of claim 16, wherein the buffer layer, the half-cell of the balancing cell, or both the buffer layer and the half-cell of the balancing cell are configured to permit flow-through the respective layer or half-cell.

23. A method of operating a balancing cell of claim 11, said method comprising applying an electric potential across said first and second porous electrodes, sufficient to generate oxygen.

* * * * *

UNITED STATES PATENT AND TRADEMARK OFFICE
CERTIFICATE OF CORRECTION

| | |
|---|---|
| PATENT NO. | : 11,217,806 B2 |
| APPLICATION NO. | : 16/755340 |
| DATED | : January 4, 2022 |
| INVENTOR(S) | : Loretz et al. |

It is certified that error appears in the above-identified patent and that said Letters Patent is hereby corrected as shown below:

On the Title Page

Item (54), Under Column No. 1, Line No. 1, Replace:
"PH BUFFERING"
With:
-- pH BUFFERING --

Item (57), In Abstract, Under Column No. 2, Line No. 7, Replace:
"oxygen (O2); wherein"
With:
-- oxygen ($O_2$); wherein --

In the Specification

Under Column No. 1, Line No. 1, Replace:
"PH BUFFERING"
With:
-- pH BUFFERING --

In the Claims

Under Column No. 24, Line Nos. 12-13, Replace:
"communication the first,"
With:
-- communication with the first, --

Signed and Sealed this
Third Day of May, 2022

Katherine Kelly Vidal
*Director of the United States Patent and Trademark Office*